Nov. 7, 1961 T. L. DAVIES 3,007,703

MAGNETIC TAPE SOUND RECORDING AND REPRODUCING APPARATUS

Filed Dec. 5, 1958 5 Sheets-Sheet 1

INVENTOR
Thomas Leslie Davies
BY
Stevens, Davis, Miller & Mosher
his ATTORNEYS

MAGNETIC TAPE SOUND RECORDING AND REPRODUCING APPARATUS

Filed Dec. 5, 1958

INVENTOR

Thomas Leslie Davies

BY

Stevens, Davis, Miller & Mosher his ATTORNEYS

MAGNETIC TAPE SOUND RECORDING AND REPRODUCING APPARATUS

Filed Dec. 5, 1958 5 Sheets-Sheet 3

INVENTOR
Thomas Leslie Davies
BY
Stevens, Davis, Miller & Mosher
his ATTORNEYS

Nov. 7, 1961 T. L. DAVIES 3,007,703
MAGNETIC TAPE SOUND RECORDING AND REPRODUCING APPARATUS
Filed Dec. 5, 1958 5 Sheets-Sheet 4
FIG. 11.
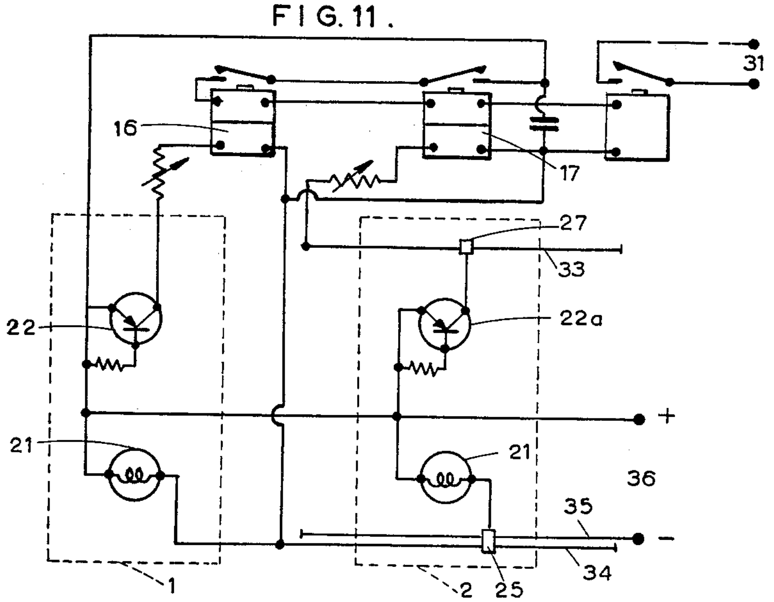
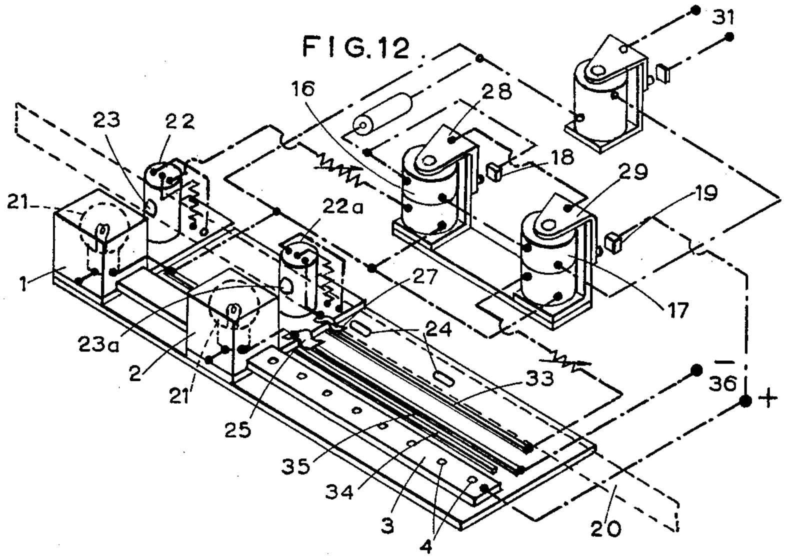
INVENTOR
Thomas Leslie Davies
BY
Stevens, Davis, Miller & Mosher
his ATTORNEYS INVENTOR
Thomas Leslie Davies
BY
Stevens, Davis, Miller & Mosher
his ATTORNEYS United States Patent Office 3,007,703

Patented Nov. 7, 1961

3,007,703
MAGNETIC TAPE SOUND RECORDING AND REPRODUCING APPARATUS

Thomas Leslie Davies, 17 Top Park, Beckenham, England

Filed Dec. 5, 1958, Ser. No. 778,483
15 Claims. (Cl. 274—4)

This invention relates to recording and reproducing apparatus employing magnetic tape as a recording medium. The control of the tape in either recording, reproducing or in fast winding is normally effected by push-buttons, levers or rotary controls linked to the recording mechanism and manually operated. In addition, a manually operated "stop" control is an essential requirement when intermediate stopping points are desired along the whole length of a reel of recording tape.

It will be appreciated that a good deal of separate subject matter can be recorded on a long length of tape and much time must be expended in locating precisely the material that it is desired to reproduce. The location of any particular section of the tape is usually effected by visual means, such as white tape markings, a time scale, a turns counter embodied in the recording mechanism, or other similar device. Any of these means affords only a visual aid in indicating the appropriate time at which to manually operate the "stop" control. When, for example, the tape is being wound at high speed, such arrangements provide only an approximate means for stopping the tape mechanism at the desired place, since the human element is ultimately involved, in operating the "stop" control. Other preselective means for locating desired stopping points in the tape traverse, such as a sequentially operated stopping relay, are usually capable of use in one direction only.

It is an object of this invention to provide an electro-mechanical means for stopping a fast or slow winding tape at the exact point desired. To this end, the recording tape is prepared, at some previous time of recording, with raised markings or small apertures grouped in pairs, each pair being spaced at incremental distances apart, to locate or index the separate subject matters recorded. The said markings or apertures are then arranged to control a pair of "sensing" electromagnetic contacts or a pair of phototransistor cells, either of which is adapted to operate two electromagnetic relays, thereby providing a control system which enables any desired stopping places along the whole length of a reel of recording tape to be preselected.

Another object of the invention is to provide such selective stopping control whilst the tape is being wound at high speed in either direction, or equally, whilst the recording apparatus is functioning to record or reproduce in either direction.

The invention will now be described by way of example with reference to the accompanying diagrammatic drawings in which:

FIGURES 10 and 11 are typical circuit diagrams applicable to the embodimet shown in FIGURES 3, 5 and 7.

FIGURE 12 is a perspective view of a device incorporating the electrical circuit shown in FIGURE 11.

Figure 1:
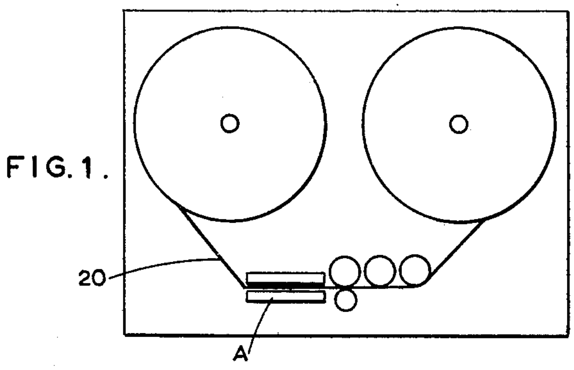
FIGURE 1 is a plan view of a typical tape recording and reproducing apparatus showing the disposition of a device (designated generally by the reference character A) according to the invention with respect to the tape, which position may be varied to suit requirements.

*Mechanical description.*—Referring to the drawings, the selector device comprises a static assembly 1 and a movable assembly 2 both mounted on a perforated metal rail 3 having equally spaced perforations 4 which serve as locating points for varying the interval distance between the two assemblies.

Figure 2:
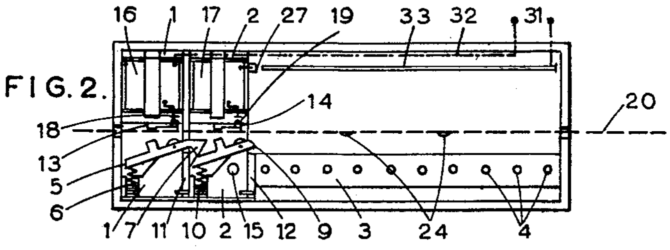
FIGURE 2 is a plan view showing one embodiment of the invention in which "sensing" electromagnetic contacts are responsive to raised spaced markings on the tape, the device being shown in the "off" position.
Figure 4:
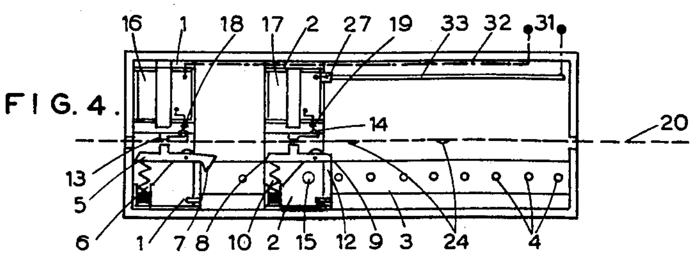
FIGURES 4 and 5 are plan views of the devices shown in FIGURES 2 and 3 respectively in the operative position.
Figures 6, 7:
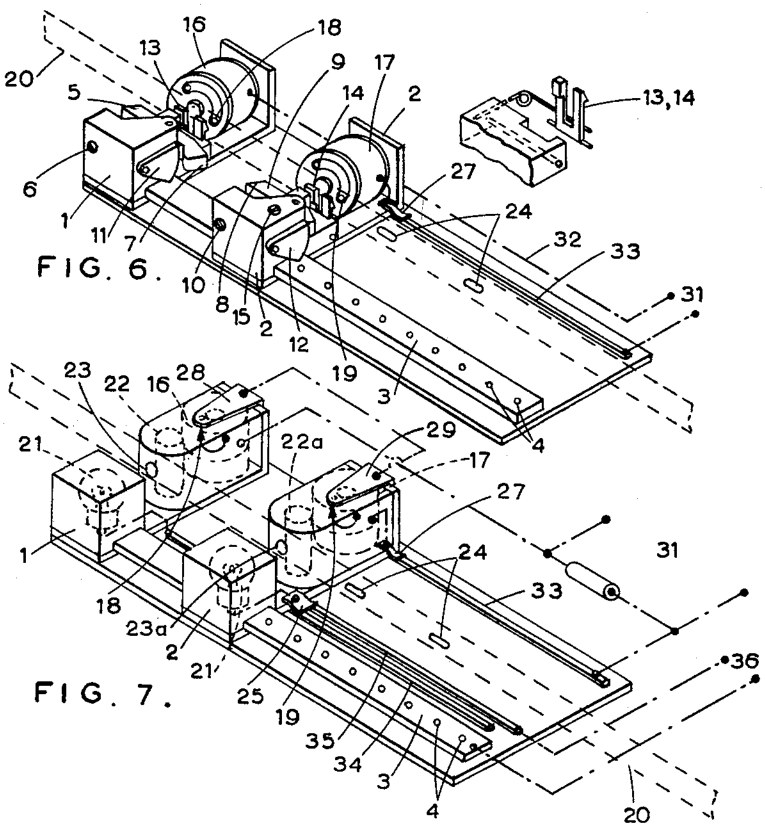
FIGURE 6 is a perspective view of the device shown in FIGURES 2 and 4 in an operative position and showing a part of the electrical circuit.
FIGURE 7 is a perspective view of the device shown in FIGURES 3 and 5 in an operative position and showing a part of the electrical circuit.

Referring to FIGURES 2, 4 and 6, the assembly 1 comprises a pivoted lever contact 5 loaded by means of a spring 6 adjustable by means of a setscrew. The end 7 of the lever 5 is bevelled to register with the bevel 8 on a lever 9, which is pivotally secured to the moving assembly 2. The contact of the lever 9 is also loaded by means of a spring 10 having a setscrew adjustment. Both the levers 5 and 9 are provided with adjustable cam stops 11 and 12 respectively which are affixed to the sides of the assemblies 1 and 2 respectively, for the purpose of adjusting the gaps of the two gates 5—13 and 9—14. The construction of the moving assembly 2 is similar to that of the fixed assembly 1, except in the shape and disposition of the lever 9 and the inclusion of a spring-loaded ball locator 15, which is adapted to register with the perforations 4 in the rail 3. The iron armatures which support the electromagnetic windings 16 and 17 are fixed to the rear of the assemblies 1 and 2 respectively. The arms 13 and 14 are identical, and are lightly spring loaded. In shape, they are as shown in FIGURE 6 and comprise an iron armature fixed to one limb and an electrical contact fixed to the other limb. Both the arms 13 and 14 are pivotally attached at their bases to the assemblies 1 and 2 respectively and are free to move backwards in the direction of the contacts 18 and 19, but are fixed in relation to any forward movement in the direction of the tape 20. The contacts on the arms 13 and 14 are arranged in close proximity to the recording tape 20 and form the rear halves of the two gates 5—13 and 9—14 through which the recording tape 20 passes. The electrical contacts on the arms 13 and 14 are located opposite their counterparts 18 and 19 which are mounted on the electromagnets 16 and 17.

Referring to FIGURES 3, 5, 7 and 10, the assembly 1 comprises a front compartment containing a small electric lamp 21 and a rear compartment containing a phototransistor 22 which is electrically connected to control a primary winding of a relay 16 in the same compartment. There is an aperture at the back of the lamp compartment coinciding with the aperture 23 in the phototransistor housing. The recording tape 20 is arranged to travel between these two apertures and no light normally passes through the tape 20 when in position. When the tape 20 is set in motion, any apertures such as are shown at 24 in FIGURE 9, will allow light from the lamp 21 to reach the phototransistor 22. The moving assembly 1 is similar in all respects to the fixed assembly 2 except that it contains additionally a spring loaded ball locator as described with reference to the embodiment shown in FIGURE 4, which ball locator registers with the perforations 4 in the rail 3. Also, there are two sliding electrical contacts 25 and 27 which are fixed to, but insulated from the base of this assembly. The relays 16 and 17 have iron armatures 28 and 29 respectively, the contacts at the end of which register with the contacts 18 and 19 affixed to the relay bobbins. As both the assemblies 1 and 2 have a metal frame which is either fixed to, or effects sliding contact with the rail 3, and since the armatures 28 and 29 are mounted on each assembly frame, it follows that an electrical circuit is maintained between the armatures 28 and 29 at all times.

Figures 8, 9:
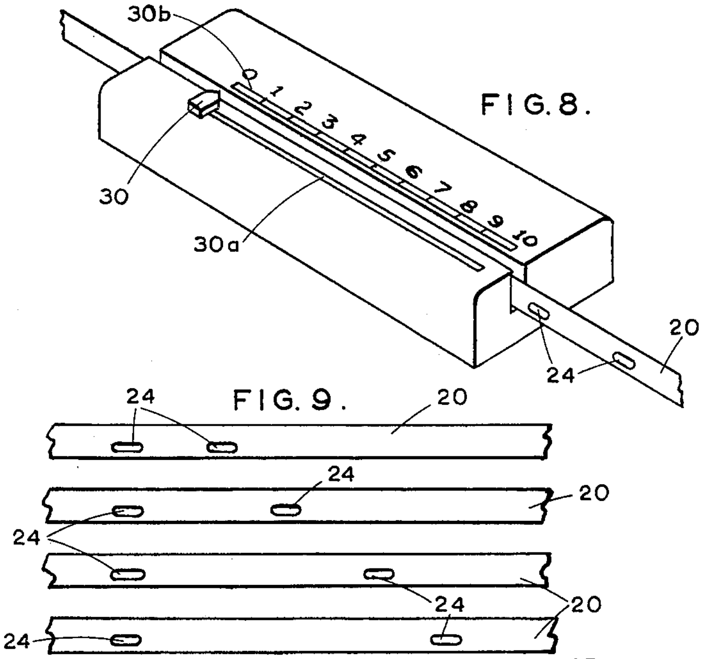
FIGURE 8 is an external perspective view of a device constructed in accordance with either of the embodiments.
FIGURE 9 is a plan view showing typical raised markings or apertures on recording tapes.

The raised markings or apertures 24 on the tape 20 can be produced in any suitable manner e.g. by means of an embossing die or a punch, the markings or apertures being provided at varying intervals as indicated by way of example in FIGURE 9 which intervals are identical with the intervals existing between the various settings of the two assemblies on the selector device.

Referring to FIGURE 8, a pointer 30 is located on the outer casing of the device, the pointer 30 being attached to the movable assembly 2 by a member (not shown) which passes through a longitudinal slot $30^a$ in the housing. The pointer 30 is adapted to register with the numbered divisions $30^a$ on the casing in conformity with the movement of the movable assembly 2 thereby affording an indication of the particular passage on the tape that is being selected.

*Electrical description.*—The internal electrical circuit of the device consists broadly of the relays 16 and 17 which are actuated either by two "sensing" contacts which are responsive to raised markings on the recording tape 20, or by the two phototransistor cells 22 and $22^a$ which respond whenever light is admitted from the lamps 21 through apertures in the tape. When the relays 16 and 17 close simultaneously, the circuit across 31 is completed since the armatures 28 and 29 are already connected to each other through the metal frames of the assemblies 1 and 2 mounted on the metal rail 3. The simultaneous closing of both relay contacts occurs when the appropriate pair of tape markings or apertures coincide with the particular space setting of the two assemblies. The internal circuit across 31 so completed, is employed as a selective switch to control an external solenoid (not shown), which is linked to the main stop control and brakes of a conventional tape recording apparatus.

The device illustrated in FIGURES 2, 4 and 6 is electrically energised from a direct current source applied at the point 31, having a large capacitor across this point. The energising current is in turn switched through the main stop switch control of the recording apparatus and is cut off whenever the latter comes to rest. The purpose of the large capacitor is to impart a small time delay in the de-energisation of the electromagnetic relays 16 and 17 after the current from the selector device has been cut off. This ensures effective control over the external solenoid current and also the operation thereof until after the recording mechanism has come to rest.

With reference to the embodiment shown in FIGURES 2, 4 and 6, after the reservoir condenser has discharged through the magnetic relays, the selector device too becomes inoperative as the arms 13 and 14 are released and the internal circuit 32 is broken. The arms 13 and 14 each comprise an iron armature mounted side by side with an electrical contact, the whole being pivotally mounted at the base to the metal assemblies 1 and 2 respectively. There is an electrical connection between the arms 13 and 14 previously referred to.

With reference to the embodiment shown in FIGURES 3, 5, 7 and 10, the discharging reservoir condenser causes the armatures 28 and 29 to be released as hereinbefore described, thus breaking the internal circuit 32. The armatures 28 and 29 are provided with electrical contacts at the end of each which register with the contacts 18 and 19 mounted on the relay bobbins. When the assembly 2 is moved to any one of the operative positions shown, the sliding contacts 25 and 27 contact the electrical rails 33, 34 and 35 in order to preset the internal circuits of the device. The sliding contact 27 is electrically connected to one side of the secondary winding of the relay 17, and it is insulated from the assembly 2 as also is the other sliding contact. The sliding contact 27 supplies the necessary voltage from the rail 35 to energize the relays 16 and 17 and the phototransistors 22 and $22^a$ and such sliding contact also supplies current for the lamps 21. The return lead is by way of the rail 3.

Referring to the embodiment shown in FIGURE 4, the sliding contact 27 engages the electrical rail 33 in order to preset the electrical circuit of the device internally. The sliding contact 27 is electrically connected to one end of the winding of the electromagnet 17 and it is also mounted upon, but electrically insulated from the assembly 2.

Figure 3:
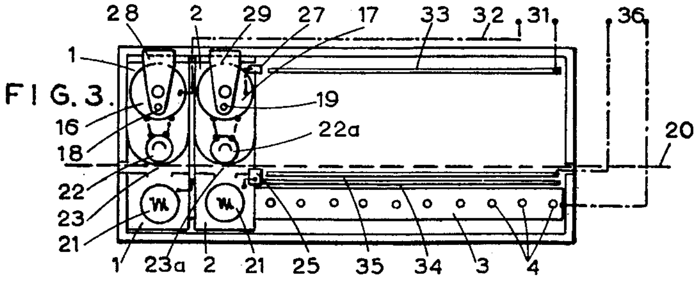
FIGURE 3 is a plan view showing another embodiment of the invention in which phototransistor cells responsive to light admitted to spaced apertures in the tape actuate electromagnetic relays, the device being shown in the "off" position.
Figure 5:
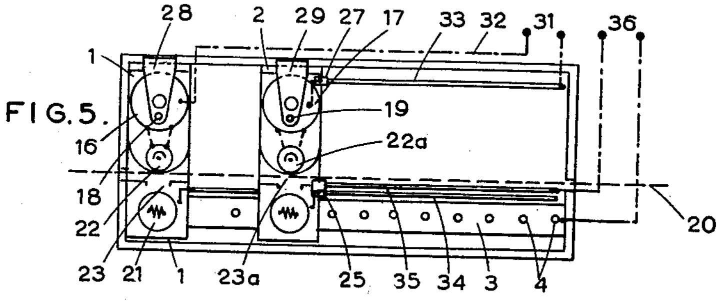

With reference to FIGURES 3, 5 and 7, the electromagnetic relays 16 and 17 are each provided with a primary and secondary winding and are wound on bobbins made of non-conducting material, which are mounted on iron cores attached to assemblies 1 and 2 respectively. The secondary windings of the relays 16 and 17 are energised by the D.C. voltage source 36 via the circuit 32 and the two pairs of series contacts 18—28 and 19—29. A reservoir condenser as already described is connected across the two windings at 31. In operation, with reference to the embodiment shown in FIGURES 2, 4 and 6 the arms 13 and 14 close against the contacts 18 and 19. Since the arms 13 and 14 are electrically connected to each other, it follows that the electrical circuit across 31 will be completed when both contacts close simultaneously. Likewise with reference to the embodiment shown in FIGURES 3, 5 and 7 the two pairs of contacts 18—28 and 19—29 operate in a similar manner.

It will be understood that the foregoing details are given by way of example only and that modifications of the basic design and disposition of the parts and the number of operating positions may be made to suit requirements. FIGURE 11, for example, shows the electrical circuit in which the two transistor cells are employed to control two external relays and FIGURE 12 is a perspective view showing this arrangement. Where dual track selection is required, means may be provided to raise and lower the device as a whole; alternatively, a side-by-side duplication of the device could be effected.

The device operates in the following manner:

When the assembly 2 is moved to any one of the locating numerals shown opposite the pointer 30 (FIGURE 8) it is brought into an operative position. In the embodiment illustrated in FIGURE 6, the splayed ends of the lever contacts 5 and 9 are released from each other, thereby forming two gates, 5—13 and 9—14, the gaps of which are adjusted by the variable stops 11 and 12, to permit the recording tape 20 to just pass through freely in single thickness. When the rail 33 is engaged by the sliding contact 27, energising current is made available.

When the recording tape 20 passes between the two gates either slowly or at high speed, the two pairs of contacts 13—18 and 14—19 will be closed at random by the raised tape markings 24, as these pass through the gates 5—13 and 9—14, displacing the contact arms 13 and 14 from time to time. It will be appreciated that unless both pairs of contacts close simultaneously, the electrical circuit across point 31, in which the two electromagnets 16 and 17 form a link, will not be completed.

Figure 10:
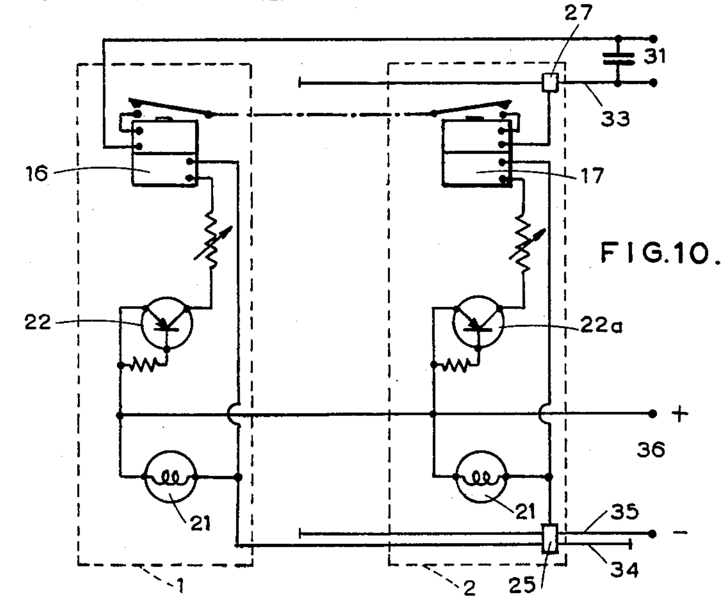

In the embodiment illustrated in FIGURES 7 and 10, when the device is set to the operative position, the electrical rails 34 and 35 are engaged by the sliding contact 25 to permit the energisation of the device. The rail 33 is engaged by the sliding contact 27 in order to preset the control circuit 31. The phototransistor current is adjusted across the primary windings of the relays 16 and 17 respectively to close the armatures 28 and 29 upon light being admitted to both phototransistors.

When the previously prepared apertures in the recording tape 20 as before described pass between the two phototransistors 22 and 22a and their light sources 21 and each assembly, the phototransistors and the relays controlled thereby will be operated at random as in the embodiment described with reference to FIGURE 6. As before, only the two apertures formed in the tape 20 which are spaced at a distance equal to the distance between the two phototransistors in any selected settings of the assemblies 1 and 2 will close the relay contacts 18—28 and 19—29 simultaneously. When this occurs in either of the two embodiments described above, the electromagnetic relays 16 and 17 will attract and hold the armatures 28 and 29 or 13 and 14 against the contacts 18 and 19 in a closed circuit condition until after the electrical circuit is broken externally. A small delay is brought about as above described by the inclusion of a capacitor across the relay circuit. The external circuit will be broken when the external solenoid (not shown) which is controlled by the selector switch, has operated the main "stop" switch of the recording apparatus. When this occurs, the D.C. current supplied to the selector device by way of the main "stop" control switch of the recording or reproducing apparatus is also cut off, thereby rendering the selector device inoperative until the recording mechanism is started again.

With further reference to the embodiment shown in FIGURE 7, it will be understood that in the event of tape breakage or the inadvertent runing out of the tape at the end of a reel during winding, the absence of tape across the apertures 23 and 23a will result in light being admitted simultaneously to both phototransistors, thereby causing the device to operate and bring the recording apparatus to rest. It will also be appreciated that when the selector is in the "off" position in either embodiment, the sliding contacts will clear the electrical rails, thus breaking the internal circuit and rendering the device inoperative. Also when the device illustrated in FIGURES 4 and 6 is in the "off" position, the levers 5 and 9 meet at their respective splayed ends 7 and 8 and force each other apart. Widening of the gaps in the two gates, 5, 13 and 9, 14 is thus effected ensuring freedom from contact with the tape so as to permit threading and removal of the recording tape.

As an alternative to raised marks or perforations on the tape, the magnetic coating on the tape can be utilized to effect control of the relays. To this end, a series of pulse signals are recorded on the tape at the desired locations, the signal records being disposed in pairs at incremental spacings, a pair of magnetic heads of relatively small dimensions and a pair of pick-up heads respectively amplified through a pair of transistors being employed to actuate the relays, in response to the signal records.

Figure 13:
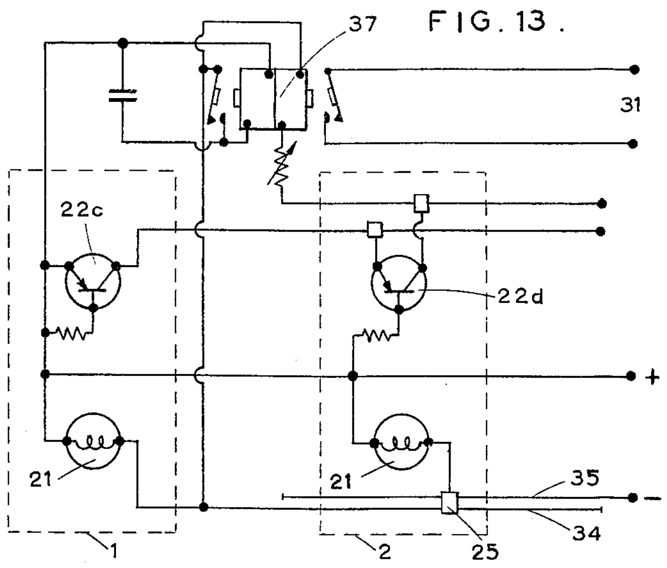
FIGURE 13 is a circuit diagram showing a modification.
Figure 14:
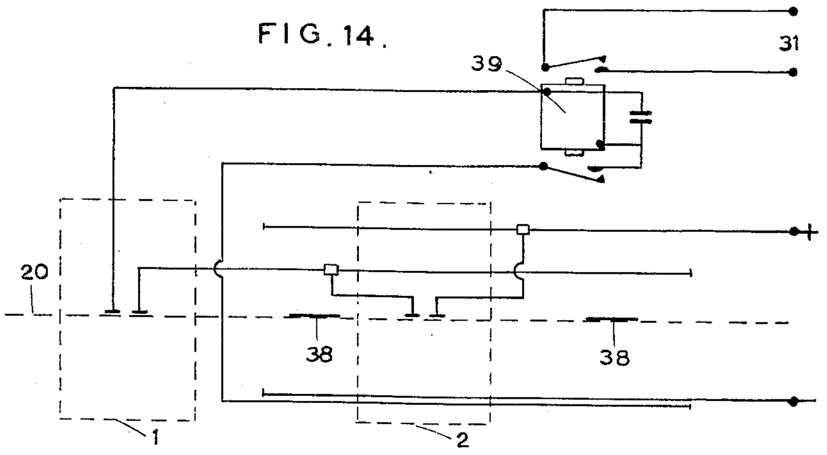
FIGURE 14 is a circuit diagram showing a further modification.

In the embodiment shown in FIGURE 13 a pair of phototransistors 22c and 22d are employed as a series-connection switch in place of the relays 16 and 17. A single external relay 37 is also employed to actuate the solenoid which controls the main "stop" switch on a conventional recording and reproducing apparatus. In operation, the phototransistors both conduct only when light has been admitted thereto simultaneously, thus permitting, when this occurs, the energisation of the relay 37 which controls the said solenoid.

In the embodiment shown in FIGURE 13 metal foil strips 38 are attached to the tape 20 in pairs in incremental spacings as hereinbefore described. The strips 38 complete the circuit across two pairs of slidable contacts mounted on the assemblies 1 and 2 respectively. In operation, only when both pairs of contacts are short-circuited by the strips 38 simultaneously will the entire circuit be completed to permit energisation of the relay 39 which effects control of the solenoid that actuates the main "stop" switch and brakes of a conventional recording and reproducing apparatus in the manner hereinbefore described.

I claim:

1. In combination, a magnetic tape having location forming means provided in respective pairs having different longitudinal spacings at spaced points along the length of the tape and a magnetic tape recording and reproducing apparatus including brake means and a stop control therefor, switch means for actuating the stop control and including a pair of electrically actuated assemblies responsive to said location forming means on the tape, and means to adjust the longitudinal spacings between said assemblies to conform to the spacings between each pair of location forming means.

2. The combination of claim 1, wherein a solenoid is provided actuating the stop control and said assemblies constitute phototransistors with the location forming means being apertures in the tape so light passes through the apertures to the phototransistors, and wherein a relay controlled by said phototransistors is provided which controls the solenoid.

3. The combination of claim 1, wherein said assemblies include a movable light-sensitive relay and a fixed light-sensitive relay, and a rail having perforations spaced equidistantly from each other, said movable light-sensitive relay having yieldable detent means engageable with the perforations to serve as locating points for varying the interval distance between the relays.

4. The combination of claim 1, wherein said assemblies include a pair of adjustable magnetic gate assemblies, said location forming means including raised marks on the tape and said magnetic gate assemblies being capable of being spaced apart longitudinally so as to cause them to be responsive only to similarly spaced marks on the tape.

5. The combination of claim 4, wherein a pair of adjustable cams are provided to permit said magnetic gates to be adjusted to compensate for wear.

6. The combination of claim 1, wherein said electrically actuated assemblies include light-sensitive relay assemblies and said location forming means includes apertures in the tape, said relay assemblies being relatively adjustable so as to permit them to be spaced longitudinally from each other so as to respond only to selected pairs of similarly spaced apertures in the tape.

7. The combination of claim 1, wherein one of said assemblies is fixed and the other is movable longitudinally and wherein a longitudinal rail is provided having perforations spaced equidistantly from each other and yieldable detent means carried by the movable assembly and engaging the perforations so as to locate the movable assembly in adjustable spaced relation to the fixed assembly.

8. In combination, a magnetic tape having perforations disposed in longitudinally spaced pairs having different longitudinal spacings at varying spaced points along the length of the tape, a magnetic tape recording and reproducing apparatus including brake means, a stop control switch for the brake means and selective control means for arresting the movement of the tape during a winding operation, said last means being responsive to the perforations and including light-sensitive cells connected in series and operated by light rays admitted simultaneously thereto through the apertures, means to adjust the longitudinal spacings between the cells in accordance with the spacing between a selected pair of perforations, a relay energized by the cells and an external solenoid actuated by the relay and coupled to the stop control switch.

9. In combination, a magnetic tape having location forming means disposed in pairs at varying longitudinally spaced positions along the length of the tape, a magnetic tape recording and reproducing apparatus including brake means, a stop control switch for the brake means and selective control means for arresting the movement of the tape during a winding operation, said last named means being responsive to the location forming means and including relay assemblies adjustable longitudinally relative to each other in accordance with the spacing between the pairs of location forming means and constituting a selective electric switch to operate the stop control switch.

10. In combination, a magnetic tape having a plurality of electrically conductive marks disposed in pairs at varying spacings along the length of the tape, a magnetic tape recording and reproducing apparatus including a winding means, a brake means for the winding means, a stop control switch for the brake means, a solenoid coupled to said switch, a relay for actuating the solenoid and selective control means for arresting the movement of the tape during a winding operation, said last means including a fixed and a movable assembly, two pairs of contacts carried by said assemblies, said marks being adapted to complete an electrical circuit across the pairs of contacts, and means to adjust the spacing of said assemblies from each other by moving the movable assembly so that the spacing can be varied in conformity with the spacing between the marks.

11. The combination of claim 10, wherein said marks comprise strips of metal foil.

12. The combination of claim 10, wherein said pairs of contacts are slidable on the fixed and movable assemblies.

13. In combination, a magnetic tape, respective pairs of pulse signals recorded on the tape at spaced points along the length of the tape and having different longitudinal spacings, and a magnetic tape recording and reproducing apparatus including brake means and a stop control therefor, switch means for actuating the stop control and including a pair of electrically actuated assemblies responsive to said pulse signals, and means to adjust the spacings between said assemblies to conform to the spacings between each pair of pulse signals.

14. The structure of claim 13, and wherein a stationary rail is provided parallel to the tape, said rail having equally spaced perforations therein, one of said assemblies being fixed relative to the rail and the other assembly being movable therealong, and yieldable detent means carried by the movable assembly and engageable with the perforations so as to locate the movable assembly in predetermined spaced relationship relative to the fixed assembly corresponding to said spacings between the pairs of pulse signals.

15. In combination, a magnetic tape having pulses recorded thereon in pairs at varying longitudinally spaced positions along the tape, a magnetic tape recording and reproducing apparatus including brake means, a stop control switch for the brake means, and selective control means for arresting the movement of the tape during a winding operation, said last-named means being responsive simultaneously to a pair of said spaced pulses and including a pair of pulse-responsive relay assemblies adjustable longitudinally relative to each other in accordance with the spacings between the pairs of recorded pulses and defining a selective electric switch to operate the stop control switch.

References Cited in the file of this patent

UNITED STATES PATENTS

| | | |
|---|---|---|
| 1,358,085 | Lewis | Nov. 9, 1920 |
| 2,551,198 | Barrett | May 1, 1951 |
| 2,710,934 | Senn | June 14, 1955 |
| 2,732,504 | Steele | Jan. 24, 1956 |
| 2,753,757 | Roth | July 10, 1956 |